(12) United States Patent
Covey et al.

(10) Patent No.: US 11,031,225 B2
(45) Date of Patent: Jun. 8, 2021

(54) METHODS AND SYSTEMS FOR CONTROLLING ION CONTAMINATION

(71) Applicant: DH Technologies Development Pte. Ltd., Singapore (SG)

(72) Inventors: Thomas R. Covey, Newmarket (CA); Yves LeBlanc, Newmarket (CA); Bradley B. Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 161 days.

(21) Appl. No.: 16/335,077

(22) PCT Filed: Sep. 13, 2017

(86) PCT No.: PCT/IB2017/055541
§ 371 (c)(1),
(2) Date: Mar. 20, 2019

(87) PCT Pub. No.: WO2018/055483
PCT Pub. Date: Mar. 29, 2018

(65) Prior Publication Data
US 2019/0221415 A1    Jul. 18, 2019

Related U.S. Application Data

(60) Provisional application No. 62/397,202, filed on Sep. 20, 2016.

(51) Int. Cl.
*H01J 49/06* (2006.01)
*G01N 30/72* (2006.01)
*G01N 30/84* (2006.01)

(52) U.S. Cl.
CPC ........ *H01J 49/067* (2013.01); *G01N 30/7233* (2013.01); *G01N 30/84* (2013.01)

(58) Field of Classification Search
None
See application file for complete search history.

(56) References Cited

U.S. PATENT DOCUMENTS 5,847,386 A * 12/1998 Thomson .............. H01J 49/005
250/288
7,315,020 B2    1/2008 Park et al.
(Continued)

FOREIGN PATENT DOCUMENTS

WO        2016063236 A1    4/2016

OTHER PUBLICATIONS

International Search Report and Written Opinion for PCT/IB2017/055541 dated Jan. 12, 2018.

*Primary Examiner* — Paul M. West
*Assistant Examiner* — Mark A Shabman

(57) ABSTRACT

Because most ion optics of mass spectrometry systems are subject to ion deposition and may exhibit significantly different behavior following substantial contamination (e.g., loss of sensitivity), fouled surfaces must be regularly cleaned to maintain sensitivity. While the surfaces of front-end components (e.g., curtain plates, orifice plates, Qjet, Q0, IQ0) may be relatively easy to clean, the fouling of components contained within the downstream high-vacuum chambers (e.g., Q1, IQ1) can incur substantial delays and expense as the high-vacuum chambers must be vented and substantially disassembled prior to cleaning. Methods and systems for controlling contamination of components of mass spectrometer systems are provided herein. By reducing the transmission of contaminating ions during non-data acquisition periods, the present teachings can increase throughput, improve robustness, and/or decrease the downtime typically required to vent/disassemble/clean the fouled components.

16 Claims, 4 Drawing Sheets

(56) References Cited

U.S. PATENT DOCUMENTS

| | | | |
|---|---|---|---|
| 2003/0062474 A1 | 4/2003 | Baranov | |
| 2004/0206901 A1* | 10/2004 | Chen | H01J 49/165 250/288 |
| 2006/0226354 A1 | 10/2006 | Schneider et al. | |
| 2007/0181800 A1* | 8/2007 | Jolliffe | H01J 49/107 250/288 |
| 2010/0148059 A1 | 6/2010 | Jolliffe et al. | |
| 2012/0305759 A1* | 12/2012 | Park | H01J 49/424 250/282 |
| 2013/0151190 A1* | 6/2013 | Platt | H01J 49/0009 702/123 |
| 2015/0108347 A1* | 4/2015 | Vidal de Miguel | G01N 27/622 250/288 |

\* cited by examiner

METHODS AND SYSTEMS FOR CONTROLLING ION CONTAMINATION

RELATED APPLICATION

This application claims priority to U.S. provisional application No. 62/397,202, filed on Sep. 20, 2016, entitled "Methods and Systems for Controlling Ion Contamination," which is incorporated herein by reference in its entirety.

FIELD

The present teachings are directed to mass spectrometry, and more particularly to methods and systems for controlling and/or reducing ion flux being transmitted into the high vacuum portions of a mass spectrometer.

INTRODUCTION

Mass spectrometry (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

In mass spectrometry, sample molecules are generally converted into ions using an ion source and then separated and detected by one or more mass analyzers. For most atmospheric pressure ion sources, ions pass through an inlet orifice prior to entering an ion guide disposed in a vacuum chamber. In conventional mass spectrometer systems, a radio frequency (RF) signal applied to the ion guide provides collisional cooling and radial focusing along the central axis of the ion guide as the ions are transported into a subsequent, lower-pressure vacuum chamber in which the mass analyzer(s) are disposed. Because ionization at atmospheric pressure (e.g., by chemical ionization, electrospray) is generally a highly efficient means of ionizing molecules within the sample, ions of analytes of interests, as well as interfering/contaminating ions and neutral molecules, can be created in high abundance. Though increasing the size of the inlet orifice between the ion source and the ion guide may increase the number of ions of interest entering the ion guide (thereby potentially increasing the sensitivity of MS instruments), such a configuration can likewise allow more unwanted molecules to enter the vacuum chamber and potentially downstream mass analyzer stages located deep inside high-vacuum chambers where trajectories of the ions of interest are precisely controlled by electric fields. Transmission of undesired ions and neutral molecules can foul/contaminate these downstream elements, thereby interfering with mass spectrometric analysis and/or leading to increased costs or decreased throughput necessitated by the cleaning of critical components within the high-vacuum chamber(s). Additionally, some ion sources (e.g., electrospray sources for generating ions throughout a liquid chromatography elution gradient) can continuously generate ions that enter the mass analyzer even during the time periods when no data is collected or no analyte of interest would be present, further accelerating the contamination of the mass analyzer. Because of the higher sample loads and contaminating nature of the biologically-based samples being analyzed with current day atmospheric pressure ionization sources, maintaining a clean mass analyzer remains a critical concern.

Accordingly, there remains a need for improved methods and systems for reducing contamination in downstream mass analyzers.

SUMMARY

Because most ion optics (e.g., lenses) of mass spectrometry systems are subject to ion deposition due to the defocusing of the ions during transmission therethrough and may exhibit significantly different behavior following substantial contamination (e.g., loss of sensitivity), fouled surfaces must be regularly cleaned to maintain sensitivity. While the surfaces of front-end components (e.g., curtain plates, orifice plates, Qjet, IQ0) may be relatively easy to clean, the fouling of components contained within the downstream high-vacuum chambers (e.g., Q0, Q1, IQ1) can result in substantial time and/or expense as the vacuum chambers must be vented and substantially disassembled prior to cleaning. Methods and systems for controlling contamination of components contained within the high-vacuum chambers of mass spectrometer systems are provided herein, and in some aspects, while maintaining the stability of the ion source and/or while continuously producing ions thereby. By reducing the transmission of ions into the sensitive components housed deep within the mass spectrometer, the present teachings can increase throughput, improve robustness, and/or decrease the downtime typically required to vent/disassemble/clean the fouled components.

In accordance with various aspects of the present teachings, a mass spectrometer system is provided that comprises an ion source housing defining an ionization chamber, the ionization chamber comprising a curtain plate defining a curtain plate aperture through which ions generated in the ionization chamber can be transmitted to one or more downstream mass analyzers. An orifice plate defining a sampling orifice is separated from the curtain plate so as to define a curtain chamber therebetween through which ions from the curtain plate aperture can be transmitted to the sampling orifice. The system also includes a power supply electrically coupled to the curtain plate and the orifice plate for providing electrical signals thereto and a controller operatively coupled to the power supply, the controller being configured to control the electrical signals applied to the curtain plate and orifice plate so as to modulate the electric field within the curtain chamber from a first configuration during a first period in which ions are preferentially transmitted through the sampling orifice and a second configuration during a second period in which ions are substantially prevented from passing through the curtain chamber to the sampling orifice.

In various aspects, the system can further comprise a curtain gas supply for flowing curtain gas into the curtain chamber, wherein at least a portion of the curtain gas is directed through the curtain plate aperture to the ionization chamber. Additionally or alternatively, a counter-current flow of curtain gas (typically nitrogen) can be provided in at least a portion of the curtain chamber. As discussed in detail below, ions can be propelled through the counter-current gas flow by the electrostatic field generated between the curtain and orifice plates during the first period, while the field in the curtain chamber can be removed or inverted during the second period such that the counter-current gas flow can prevent ions from transiting to the sampling orifice. In some related aspects, the curtain gas supply can be operatively coupled to the controller, the controller being configured to increase the volumetric flow rate of curtain gas provided to the curtain chamber during the second period.

In accordance with various aspects, the system also comprises an ion source for receiving a fluid sample and for continuously discharging said fluid sample into said ionization chamber, the power supply being electrically coupled to the ion source so as to provide an ion source voltage to the ion source for generating ions as the fluid sample is discharged into the ionization chamber, wherein a flow rate of the fluid sample discharged from the ion source during the first and second period is substantially equal and wherein the ion source voltage is substantially constant during the first and second periods.

The electric field in the curtain chamber can be modulated in a variety of manners in accordance with various aspects of the present teachings. By way of non-limiting example, in the first configuration, the curtain plate can be maintained at a voltage greater than about +500 V DC and the orifice plate can be maintained at a voltage less than about +300 V. In some aspects, for example, in the first configuration, the electric field in the curtain chamber can be configured to draw ions of a first polarity through the curtain chamber (e.g., through the curtain gas) and into the sampling orifice. In some related aspects, the orifice plate can be maintained in the first configuration at an attractive potential in a range of about 400 V DC to about 900 V DC relative to the potential of the curtain plate for ions generated by the ion source, by way of non-limiting example. In some aspects, modulating the electric field in the second configuration can comprise adjusting the potential of the orifice plate. By way of example, in the second configuration, the orifice plate can be maintained at substantially the same DC potential as the curtain plate. In this manner, for example, ions generated by the ion source are less likely to be drawn through the curtain chamber to the sampling orifice as a result of the counter current flow of curtain gas. Alternatively, the orifice plate can be maintained at a repulsive potential relative to the potential of the curtain plate for ions generated by the ion source in the second configuration.

In various aspects, the electric field can be modulated in accordance with the expected presence of an ion of interest and/or the substantial presence of interfering ionic species. By way of example, in some aspects, the fluid sample can comprise effluent from a liquid chromatography column, the first period corresponding to a first portion of the elution gradient in which an analyte of interest is likely to be present and the second period corresponding to a second portion of the elution gradient in which a relative abundance of an analyte of interest therein is likely to be reduced relative to the relative abundance of the analyte of interest in the first portion of the elution gradient. Alternatively, in some aspects, the first period can comprise a plurality of first periods with second periods therebetween (e.g., the electric field is modulated a plurality of times between the first and second configurations during a sample run), wherein each of the first periods corresponds to the timing of a sample injection into a liquid carrier stream (e.g., for flow injection mass spectrometric workflows).

The timing of modulation of the electric field within the curtain chamber can be controlled in a variety of manners. By way of example, in some aspects, the system can include a user interface for accepting input from a user defining a data collection window corresponding to the first period in which an analyte of interest is suspected of being present in said fluid sample during a sample run.

In accordance with various aspects of the present teachings, a method for controlling contamination in a mass spectrometer system is provided, the method comprising generating one or more ionized species within an ionization chamber, said ionization chamber comprising a curtain plate defining a curtain plate aperture through which ions generated in the ionization chamber can be transmitted. The exemplary method can further comprise providing an electric field within a curtain chamber between the curtain plate and an orifice plate disposed downstream from the curtain plate during a first period of ion generation and transmitting said one or more ionized species through the curtain chamber and sampling orifice during said first period. During a second period of ion generation, the electric field within the curtain chamber can be adjusted such that ions are substantially prevented from being transmitted through the curtain chamber and into the sampling orifice. For example, in some aspects, the ionized species can be generated by discharging a fluid sample from an ion source into the ionization chamber, wherein flow rates of the fluid sample discharged from the ion source during the first and second periods are substantially equal, and wherein an ion source voltage applied to the ion source is substantially constant during the first and second periods.

In accordance with various aspects of the present teachings, the method can further comprise supplying a curtain gas into the curtain chamber such that at least a portion of the curtain gas is directed through the curtain plate aperture to the ionization chamber during the first and second periods. In some related aspects, the method can further comprise increasing the volumetric flow rate of curtain gas provided to the curtain chamber during the second period relative to the first period.

In various aspects, the electric field in the curtain chamber can be configured to draw ions of a first polarity through the curtain chamber and into the sampling orifice during the first period. During the second period, the orifice plate can be maintained at substantially the same DC potential as the curtain plate, for example. Alternatively, the orifice plate can be maintained at a repulsive potential relative to the potential of the curtain plate for ions generated by the ion source during the second period.

The ion source can receive the fluid sample from a variety of sources. By way of example, in some aspects, the method can receive the fluid sample from a liquid chromatography column, wherein the first period corresponds to a first portion of the elution gradient in which an analyte of interest is likely to be present and the second period corresponds to a second portion of the elution gradient in which a relative abundance of an analyte of interest therein is likely to be reduced relative to the relative abundance of the analyte of interest in the first portion of the elution gradient.

Further understanding of various aspects of the present teachings can be obtained by reference to the following detailed description and the associated drawings, which are discussed briefly below.

BRIEF DESCRIPTION OF DRAWINGS

The foregoing and other objects and advantages of the invention will be appreciated more fully from the following further description, with reference to the accompanying drawings. The skilled person in the art will understand that the drawings, described below, are for illustration purposes only. The drawings are not intended to limit the scope of the applicant's teachings in any way.

DETAILED DESCRIPTION

Figure 1:
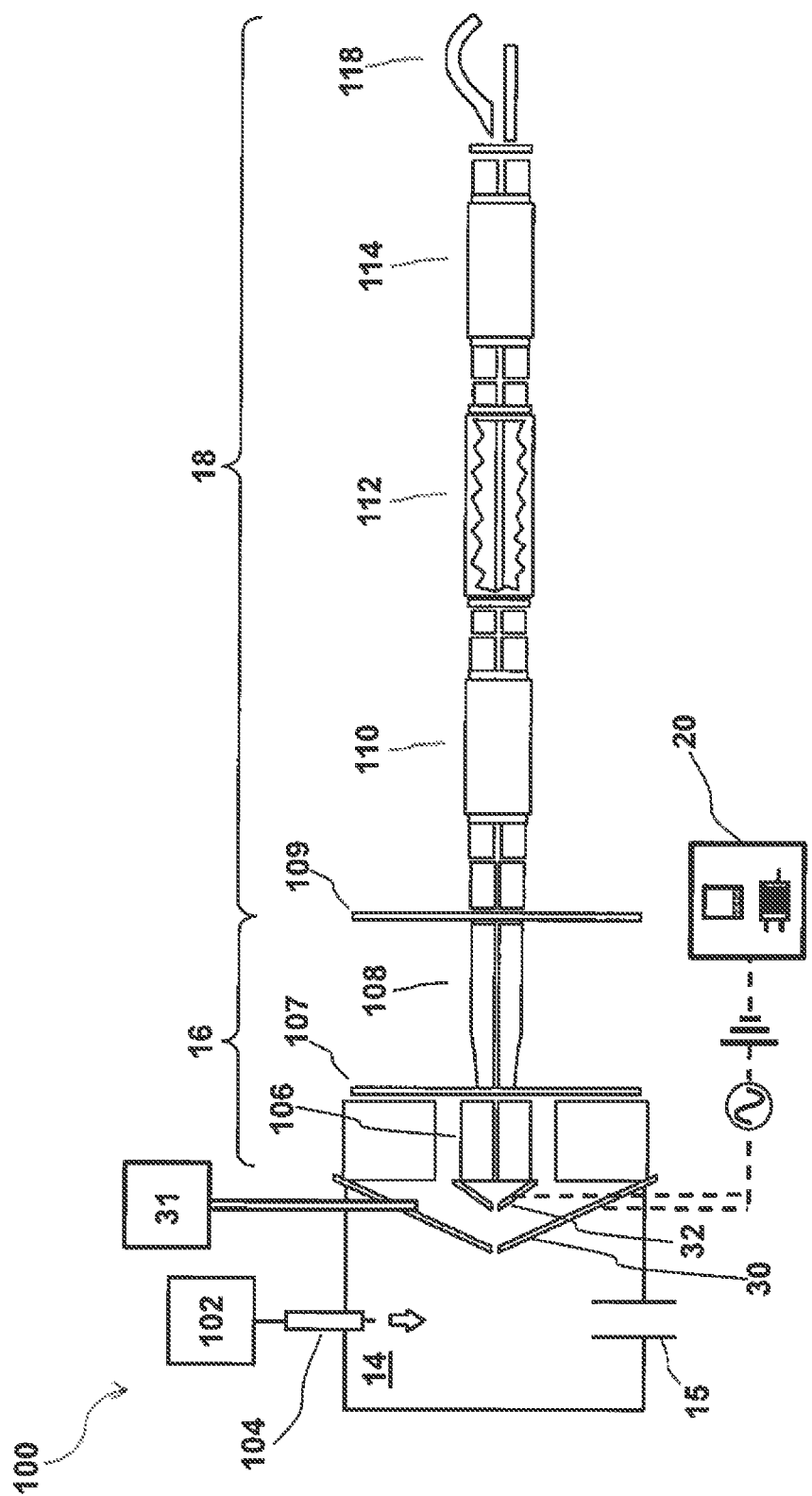
FIG. 1 schematically depicts a mass spectrometer system in accordance with some aspects of various embodiments of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

The term "about" and "substantially identical" as used herein, refers to variations in a numerical quantity that can occur, for example, through measuring or handling procedures in the real world; through inadvertent error in these procedures; through differences/faults in the manufacture of electrical elements; through electrical losses; as well as variations that would be recognized by one skilled in the art as being equivalent so long as such variations do not encompass known values practiced by the prior art. Typically, the term "about" means greater or lesser than the value or range of values stated by $\frac{1}{10}$ of the stated value, e.g., ±10%. For instance, applying a voltage of about +3V DC to an element can mean a voltage between +2.7V and +3.3V DC. Likewise, wherein values are said to be "substantially identical," the values may differ by up to 5%. Whether or not modified by the term "about" or "substantially" identical, quantitative values recited in the claims include equivalents to the recited values, e.g., variations in the numerical quantity of such values that can occur, but would be recognized to be equivalents by a person skilled in the art.

Methods and systems for preventing contamination of components within the high-vacuum chambers of mass spectrometer systems are provided herein. Because substantial fouling of components contained within the downstream high-vacuum chambers (e.g., Q1, IQ1) can have significant effects on the effective operation of a mass spectrometer system (e.g., loss of sensitivity, increased noise), reducing the ion transmission during non-analytical periods of an experiment in accordance with various aspects of the present teachings can result in a significant reduction in contamination of the downstream elements, and thus, increase throughput, improve robustness, and/or decrease the downtime typically required to service (e.g., vent/disassemble/clean) mass spectrometer systems. In various aspects, the methods and systems described herein can provide for controlling ion contamination and/or reducing ion flux being transmitted into the high vacuum portions of a mass spectrometer by modulating the electric field generated between the curtain plate and orifice plate such that the transmission of ions into the high vacuum portions is substantially reduced during non-analytical periods. By way of non-limiting example, the total ion current entering the high vacuum chambers of the mass spectrometer system (e.g., containing Q1 and operating at a pressure less than about $1 \times 10^{-4}$ Torr) can be reduced by at least 90% (e.g., at least 95%, at least 99%) during a period of a sample run in which an ion of interest is not expected to be present and/or there is expected to be a large population of interfering ions relative to a data collection window for the ion of interest. In certain aspects, the flow of sample fluid through the ion source can be kept constant during the non-analytical periods such that pre-ionization time-based separations can be maintained. Moreover, the ion source voltage can be maintained at a constant ion source voltage such that ions continue to be generated during the sample run such that the ion source remains stable (e.g., does not need to be re-equilibrated following the non-analytical periods).

While the systems, devices, and methods described herein can be used in conjunction with many different mass spectrometer systems, an exemplary mass spectrometer system 100 for such use is illustrated schematically in FIG. 1. It should be understood that the mass spectrometer system 100 represents only one possible mass spectrometer instrument for use in accordance with embodiments of the systems, devices, and methods described herein, and mass spectrometers having other configurations can all be used in accordance with the systems, devices and methods described herein as well.

As shown schematically in the exemplary embodiment depicted in FIG. 1, the mass spectrometer system 100 generally comprises a triple quadrupole (QqQ) mass spectrometer, modified in accordance with various aspects of the present teachings. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers.

As shown in FIG. 1, the exemplary mass spectrometer system 100 comprises an ion source 104 for generating ions within an ionization chamber 14, an upstream section 16 for initial processing of ions received therefrom, and a downstream section 18 containing one or more mass analyzers (e.g., Q1 and Q3), a collision cell (e.g., q2), and a detector 118. Ions generated by the ion source 104 can be successively transmitted through the elements of the upstream section 16 (e.g., curtain plate 30, orifice plate 32, Qjet 106, and Q0 108) to result in a narrow and highly focused ion beam (e.g., in the z-direction along the central longitudinal axis) for further mass analysis within the high vacuum downstream portion 18). In the depicted embodiment, the ionization chamber 14 can be maintained at atmospheric pressure, though in some embodiments, the ionization chamber 14 can be evacuated to a pressure lower than atmospheric pressure. The curtain chamber (i.e., the space between curtain plate 30 and orifice plate 32) can also be maintained at an elevated pressure (e.g., about atmospheric pressure, a pressure greater than the upstream section 16), while the upstream section 16, and downstream section 18 can be maintained at one or more selected pressures (e.g., the same or different sub-atmospheric pressures, a pressure lower than the ionization chamber) by evacuation through one or more vacuum pump ports (not shown). The upstream section 16 of the mass spectrometer system 100 is typically maintained at one or more elevated pressures relative to the various pressure regions of the downstream section 18, which typically operate at reduced pressures so as to promote tight focusing and control of ion movement.

The ionization chamber 14, within which analytes contained within the fluid sample discharged from the ion source 104 can be ionized, is separated from a gas curtain chamber by a curtain plate 30 defining a curtain plate aperture in fluid communication with the upstream section via the sampling orifice of an orifice plate 32. In accordance with various aspects of the present teachings, a curtain gas supply 31 can provide a curtain gas flow (e.g., of $N_2$) between the curtain plate 30 and orifice plate 32 to aid in keeping the downstream section of the mass spectrometer system clean by declustering and evacuating large neutral particles. By way of example, a portion of the curtain gas can flow out of the curtain plate aperture into the ionization chamber 14, thereby preventing the entry of droplets through the curtain plate aperture. Additionally, as discussed in detail below, curtain gas outflow (e.g., from the curtain gas into the ionization chamber 14 via the curtain plate aperture) can provide a barrier to ionized species that can be overcome in accordance with some aspects of the present teachings by modulating the electric field within the curtain gas chamber. Curtain gas can flow counter-current in at least a portion of the curtain chamber and ions may drift through the curtain gas flow as a result of the electric field between the curtain plate 30 and orifice plate 32. In such aspects, the curtain gas flow provided to the curtain chamber can be greater than the vacuum drag through the sampling orifice of the orifice plate 32. As discussed in detail below, in some aspects of the present teachings, the electric field generated within the curtain chamber field can be eliminated such that a counter-current curtain gas flow can provide a pneumatic block of ions and/or neutrals from traversing the curtain chamber and/or the field may be inverted to provide both a pneumatic and an electrical block of ions.

As discussed in detail below, the mass spectrometer system 100 also includes a power supply and controller 20 that can be coupled to the various components so as to operate the mass spectrometer system 10 to reduce the ion flux transmitted into the downstream high-vacuum section 18 (e.g., during non-analytical periods) in accordance with various aspects of the present teachings. In this manner, the system 100 can provide for reduced ion contamination of the various components, and in particular, those components of the high-vacuum section 18 so as to improve performance and/or reduce the frequency of cleaning of this section.

As shown, the depicted system 100 includes a sample source 102 configured to provide a fluid sample to the ion source 104. The sample source 102 can be any suitable sample inlet system known to one of skill in the art and be configured to contain and/or introduce a sample (e.g., a liquid sample containing or suspected of containing an analyte of interest) to the ion source 104. The sample source 102 can be fluidly coupled to the ion source so as to transmit a liquid sample to the ion source 104 (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting example. In some aspects, the sample source 102 can comprise an infusion pump (e.g., a syringe or LC pump) for continuously flowing a liquid carrier to the ion source 104, while a plug of sample can be intermittently injected into the liquid carrier.

The ion source 104 can have a variety of configurations but is generally configured to generate ions from analytes contained within a sample (e.g., a fluid sample that is received from the sample source 102). In the exemplary embodiment depicted in FIG. 1, the ion source 104 comprises an electrospray electrode, which can comprise a capillary fluidly coupled to the sample source 102 and which terminates in an outlet end that at least partially extends into the ionization chamber 14 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture. As is known in the art, analytes contained within the micro-droplets can be ionized (i.e., charged) by the ion source 104, for example, as the sample plume is generated. In some aspects, the outlet end of the electrospray electrode can be made of a conductive material and electrically coupled to a power supply (e.g., voltage source) operatively coupled to the controller 20 such that as fluid within the micro-droplets contained within the sample plume evaporate during desolvation in the ionization chamber 14, bare charged analyte ions or solvated ions are released and drawn toward and through the curtain plate aperture. In some alternative aspects, the discharge end of the sprayer can be non-conductive and spray charging can occur through a conductive union or junction to apply high voltage to the liquid stream (e.g., upstream of the capillary). Though the ion source 104 is generally described herein as an electrospray electrode, it should be that appreciated that any number of different ionization techniques known in the art for ionizing analytes within a sample and modified in accordance with the present teachings can be utilized as the ion source 104. By way of non-limiting example, the ion source 104 can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others. Further, as shown in FIG. 1, the ion source 104 can be disposed orthogonally relative to the curtain plate aperture and the ion path axis such that the plume discharged from the ion source 104 is also generally directed toward an exhaust port 15 of the ionization chamber 14. In this manner, liquid droplets and/or large neutral molecules that are not drawn into the curtain chamber 30 via the curtain plate orifice can be removed from the ionization chamber 14 so as to prevent accumulation and/or recirculation of the potential contaminants within the ionization chamber. In various aspects, a nebulizer gas can also be provided (e.g., about the discharge end of the ion source 104) to prevent the accumulation of droplets on the sprayer tip and/or direct the sample plume in the direction of the curtain plate aperture.

In some embodiments, upon passing through the orifice plate 32, the ions can traverse one or more additional vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18. In accordance with various aspects of the present teachings, it will also be appreciated that the exemplary ion guides described herein can be disposed in a variety of front-end locations of mass spectrometer systems. By way of non-limiting example, the ion guide 108 can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between a the QJet® ion guide and Q0 (e.g., operated at a pressure in the 100 s of mTorrs, at a pressure between a typical QJet® ion guide and a typical Q0 focusing ion guide).

As shown, the upstream section 16 of system 100 is separated from the curtain chamber via orifice plate 32 and generally comprises a first RF ion guide 106 (e.g., Qjet® of SCIEX) and a second RF guide 108 (e.g., Q0). In some exemplary aspects, the first RF ion guide 106 can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure. The Qjet 106 transfers ions received thereby to subsequent ion optics such as the Q0 RF ion guide 108 through the ion lens IQ0 107 disposed therebetween. The Q0 RF ion guide 42 transports ions through an intermediate pressure region (e.g., in a range of about 1 mTorr to about 10 mTorr) and delivers ions through the IQ1 lens 109 to the downstream section 18 of system 100.

The downstream section 18 of system 10 generally comprises a high vacuum chamber containing the one or more mass analyzers for further processing of the ions transmitted from the upstream section 16. As shown in FIG. 1, the exemplary downstream section 18 includes two mass analyzers 110, 114 (e.g., elongated rod sets Q1 and Q3) and a third elongated rod set q2 112 disposed therebetween that can be operated as a collision cell (rod sets Q1, q2, and Q3 are separated by orifice plates IQ2 between Q1 and q2, and IQ3 between q2 and Q3), as well as a detector 118, though more or fewer mass analyzer elements can be included in systems in accordance with the present teachings. For example, after being transmitted from Q0 through the exit aperture of the lens IQ1, ions can enter the adjacent quadrupole rod set Q1, which can be situated in a vacuum chamber that can be evacuated to a pressure that can be maintained lower than that of chamber in which RF ion guide 108 is disposed. By way of non-limiting example, the vacuum chamber containing Q1 can be maintained at a pressure less than about $1\times10^{-4}$ Torr (e.g., about $5\times10^{-5}$ Torr), though other pressures can be used for this or for other purposes. As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1. By way of example, the lens IQ2 between Q1 and q2 can be maintained at a higher offset potential than Q1 such that the quadrupole rod set Q1 be operated as an ion trap. In some aspects, the ions can be Mass-Selective-Axially Ejected from the Q1 ion trap in a manner described by Hager in "*A new Linear ion trap mass spectrometer*," Rapid Commun. Mass Spectro. 2002; 16: 512-526, and accelerated into q2, which could also be operated as an ion trap, for example. Ions passing through the quadrupole rod set Q1 can pass through the lens IQ2 and into the adjacent quadrupole rod set q2, which as shown can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, the quadrupole rod set q2 and entrance and exit lenses IQ2 and IQ3 can also be configured as an ion trap. Ions that are transmitted by q2 can pass into the adjacent quadrupole rod set Q3, which is bounded upstream by IQ3 and downstream by an exit lens. As will be appreciated by a person skilled in the art, the quadrupole rod set Q3 can be operated at a decreased operating pressure relative to that of q2, for example, less than about $1\times10^{-4}$ Torr (e.g., about $5\times10^{-5}$ Torr), though other pressures can be used for this or for other purposes. As will be appreciated by a person skilled in the art, Q3 can be operated in a number of manners, for example as a scanning RF/DC quadrupole or as a linear ion trap. The Q3 can also be replaced with a ToF or trap analyzer. Following processing or transmission through Q3, the ions can be transmitted into the detector 118 through the exit lens. The detector 118 can then be operated in a manner known to those skilled in the art in view of the systems, devices, and methods described herein. As will be appreciated by a person skilled in the art, any known detector, modified in accord with the teachings herein, can be used to detect the ions. It will also be appreciated by those skilled in the art that the downstream section 18 can additionally include additional ion optics, including RF-only stubby ion guides (which can serve as a Brubaker lens) as schematically depicted. Typical ion guides of ion guide regions Q0, Q1, q2 and Q3 and stubbies ST1, ST2 and ST3 in the present teachings, can include at least one electrode as generally known in the art, in addition to ancillary components generally required for structural support. For convenience, the mass analyzers 110, 114 and collision cell 112 are generally referred to herein as quadrupoles (that is, they have four rods), though the elongated rod sets can be any other suitable multipole configurations, for example, hexapoles, octapoles, etc. It will also be appreciated that the one or more mass analyzers can be any of triple quadrupoles, single quadrupoles, time of flights, linear ion traps, quadrupole time of flights, Orbitrap or other Fourier transform mass spectrometers, all by way of non-limiting example.

As noted above, the electric field in the curtain chamber can be modulated in accordance with various aspects of the present teachings to reduce contamination of the high vacuum portion 18, for example, by adjusting the relative potentials of the curtain plate 30 and orifice plate 32 so as to alternately promote or inhibit the transmission of ions from the ionization chamber 14 into and through the curtain chamber for passage to the downstream section 18. In particular, in some aspects of the present teachings, the curtain plate 30 and orifice plate 32 can be electrically coupled to a power supply (e.g., one or more voltage sources) under the influence of controller 20 so as to control the transmission of ions into and through the curtain chamber in accordance with various aspects of the present teachings. By way of example, the controller 20 can be configured to control the voltage applied to the curtain plate 30 such that during a first period in which the ion source 104 is generating ions from analytes within the sample the curtain plate 30 potential can be maintained at a potential configured to generate an electric field within the sampling region of the ionization chamber that is effective to draw the ions through the curtain plate aperture; the electric field in the curtain chamber then carries ions through the curtain chamber and thereafter into the sampling orifice. During a second period, however, the controller 20 can adjust the voltage provided to at least a portion of the curtain plate 30, for example, so as to modify the electric field within the curtain chamber to prevent ions from passing through the curtain chamber to the sampling orifice (i.e., the vacuum inlet orifice).

Figure 2:
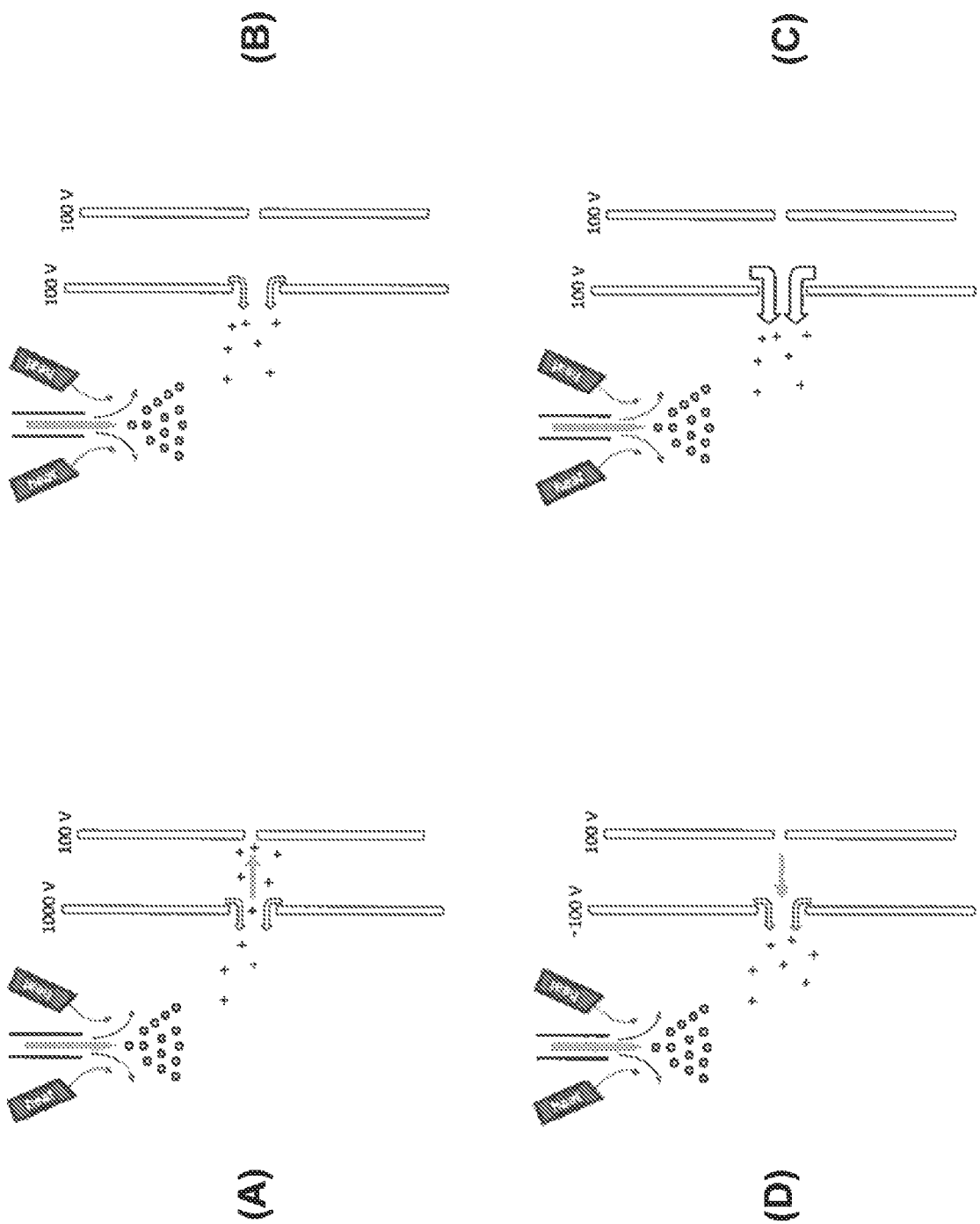
FIGS. 2A-2D depict operation of the mass spectrometer system of FIG. 1 in accordance with various aspects of the applicant's teachings.

It will be appreciated by those skilled in the art that the electric field within the gas curtain chamber can be modified in a variety of manners so as to control the transmission of ions during non-analytical periods (e.g., where no MS data is desired) in accordance with the present teachings. As discussed in detail below, the first period of ion transmission and second period of non-transmission can be selected to correspond to when an analyte of interest is likely present (e.g., in high abundance, without other interfering species) or less likely to be detected (e.g., in low abundance, in the presence of other interfering species). With reference now to FIG. 2A and by way of non-limiting example, during a period of desired ion transmission, the controller 20 can be effective to control the power supply so as to maintain the curtain plate 30 at a +1000 V DC potential and the orifice plate 32 at a potential of +100 V DC, though it will be appreciated that other potentials can be used in accordance with the present teachings. By way of non-limiting example, the curtain plate 30 can have a voltage in the range of about +300 V to about +2000 V (when operating in positive ion mode) and a voltage in the range of about −300 V to about −2000 V (when operating in negative ion mode) during the first period (e.g., when ion transmission is desired). During this period, the orifice plate 32 can have a voltage in the range of 0 V to about +500 V (i.e., a value attractive to cations relative to the curtain plate 30 potential when operating in positive ion mode) and a voltage in the range of about 0 V to about −500 V (i.e., a value attractive to anions relative to the curtain plate 30 potential when operating in negative ion mode). During the second period, the orifice plate 32 potential and curtain plate 30 potential could be set to be the same, or the orifice plate 30 can be set less attractive to the ions (e.g., so as to inverse the electric field). Assuming, for example, a positive ion source (e.g., an ESI ion source having an ion source voltage of greater than +2500 V DC applied thereto by way of non-limiting example), the electric field generated between the curtain plate 30 and orifice plate 32 would be attractive to the generated ions, thereby drawing the ions into the gas curtain chamber and through the barrier provided by the counter-flow curtain gas.

With reference to FIG. 2B, during a second period in which ion transmission is not desired, the controller 20 can in some aspects adjust the potential applied to the curtain plate 30 to be the same voltage as the orifice plate 32 (i.e., +100 V DC), though it will be appreciated that other potentials can be used in accordance with the present teachings. In this manner, the field between the curtain plate and orifice plate would be eliminated so as to remove the driving force pushing the ions through the counter-flow curtain gas. Despite the continuous generation of charged species by the ion source (e.g., an ion source could be operated at a constant ISV and with constant continuous discharge of a fluid sample), efficient transfer of the generated ions to the high-vacuum portion 18 of the mass spectrometer 100 can be substantially eliminated.

With reference now to FIG. 2D, in some aspects the potential applied to the curtain plate 30 can be reduced to a level below that of the orifice plate 32 such that the direction of the electric field during a period in which ion transmission is not desired is reversed relative to that shown in FIG. 2A. By way of example, the controller 20 can adjust the potential applied to the curtain plate 30 to be a lower magnitude of the same polarity as the orifice plate (e.g., +25 V DC) or of the opposite polarity as the orifice plate 32 (e.g., −100 V DC), as shown in FIG. 2D, such that the electric field within the curtain chamber would repel cations from the sampling orifice. It will be appreciated that under these exemplary conditions, an improved discrimination against charged species may be expected relative to the configuration depicted in FIG. 2B.

With reference to FIG. 2C, in certain aspects, the curtain gas supply 31 can also be operatively coupled to the controller 20 such that the flow rate of curtain gas entering the ionization chamber 14 can be selectively adjusted. Thus, additionally or alternatively to the modulation of the electric field within the curtain chamber as discussed above with reference to FIGS. 2B and 2D, the curtain gas supply 31 can be controlled so as to increase the flow rate of the counter-flow curtain gas during a period of non-transmission, thereby increasing the pneumatic barrier to the ionized species and large, neutral molecules alike.

Thus, the controller 20 can cause the power supply to apply a voltage to the curtain plate 30 and/or orifice plate 32 to allow passage of the ions through the curtain plate aperture, curtain chamber, and subsequently the sampling orifice to the downstream mass analyzers during temporal periods when data is to be acquired by the mass spectrometer (e.g., during elution times in which an analyte of interest is known to be eluting), and to apply another voltage to the curtain plate 30 and/or orifice plate 32 to inhibit the transmission of ions through the curtain chamber during temporal periods when data is not to be collected (e.g., during an elution time from an LC column in which no analyte of interest is eluting). In this manner, the entry of ions into the upstream section 16 and downstream high-vacuum section 18 during time periods when data is not acquired would be reduced, thereby reducing contamination of the downstream mass analyzers without a need to stop the discharge of sample liquid from the ion source 104 and/or adjust the ion source voltage. Additionally or alternatively, the controller 20 can cause the curtain gas supply 31 to increase the counter-flow curtain gas flow rate during the second period to further inhibit ions and/or neutral molecules.

In accordance with certain aspects of the present teachings, the controller can be operatively connected to a user interface, for example, to allow a user of the system to select certain parameters for operating the methods and systems described herein. By way of example, a user can select the data acquisition window (e.g., time window of an LC elution gradient) by selecting one or more of the delay time (e.g., from the beginning of elution, the data acquisition time/duration, and the time for non-data acquisition. The user can, for example, input these parameters to correspond to when an analyte of interest is likely present or less likely to be detected due to the expected presence of early eluting compounds (e.g., salts, polar compounds), later eluting compounds, and during LC column flushing and/or equilibration. Advantageously, by defining such a data acquisition window, there can be a corresponding decrease in data file size/processing requirements (as well as contamination).

Figure 3:
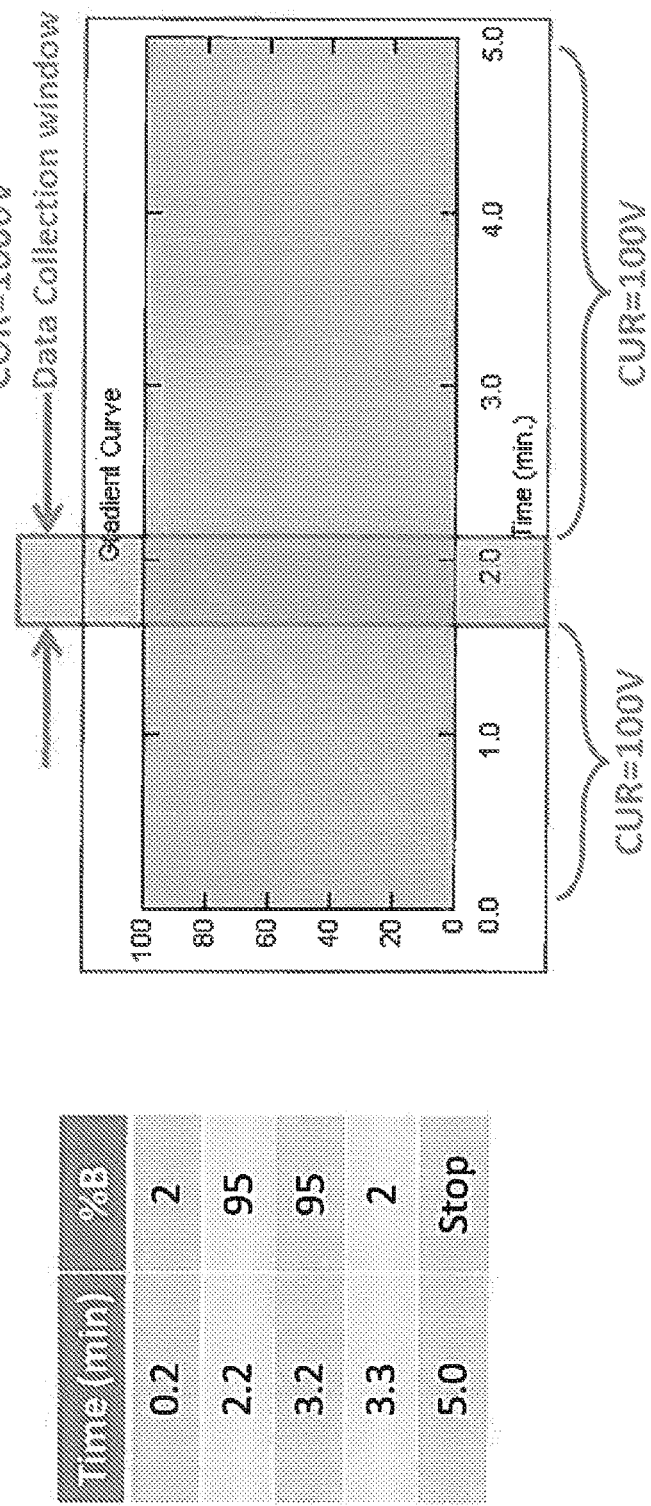
FIG. 3 depicts an exemplary LC/MS/MS workflow for use with the system of FIG. 1, in accordance with some aspects of various embodiments of the applicant's teachings.

With reference now to FIG. 3, the exemplary use of various aspects of the systems and methods disclosed herein in an exemplary LC/MS/MS workflow is depicted. The combination of liquid chromatography and mass spectrometry can be an important analytical tool for identification and quantification of compounds within a mixture. Generally, in liquid chromatography, a fluid sample under analysis is passed through a column filled with a solid adsorbent material (typically in the form of small solid particles, e.g., silica). Due to slightly different interactions of the components of the mixture with the solid adsorbent material (typically referred to as the stationary phase), the different components can have different transit (elution) times through the packed column, resulting in separation of the components within the effluent exiting the LC column which can then be delivered to the ion source 104 to be analyzed using, e.g., MS' or tandem mass spectrometry. Because the analyte of interest may have a known retention time (or can be derived empirically), it may be possible to know the portion of the effluent when the analyte is most likely to be present and the portion of the effluent in which the analyte of interest is less likely to be detected. As discussed otherwise herein, it can thus be beneficial to reduce the ion flux entering the mass spectrometer system 100 when it is known that contamination can occur but a signal for the analyte of interest is not likely. Alternatively, in some aspects, the first period can comprise a plurality of first periods with second periods therebetween (e.g., the electric field is modulated a plurality of times between the first and second configurations during a sample run), wherein each of the first periods corresponds to the timing of a sample injection into a liquid carrier stream (e.g., for flow injection mass spectrometric workflows). That is, the sample source 102 can comprise an infusion pump (e.g., an LC pump) for continuously flowing a liquid carrier to the ion source 104, while a plug of sample can be intermittently injected into the liquid carrier, with timing of ion transmission corresponding to the injection timing.

With specific reference to FIG. 3, for example, it may be known that analytes of interest in the effluent from a LC column having the depicted LC gradient profile (A=water/acetonitrile/formic acid (98/2/0.1), B=acetonitrile/formic acid (100/0.1)) preferentially elute within the depicted data collection window (e.g., between 1.58 min. to 2.08 min). In accordance with the present teachings the electric potentials of the curtain plate and orifice plate can be selected such that ions generated by the ion source within the 30 second elution time (i.e., the first period when MS data is desired) generate an electric field within the gas curtain chamber for drawing ions therethrough. During the remainder of the elution gradient (i.e., the second period(s)), the curtain plate voltage can be controlled to be equivalent to the orifice plate potential so as to alter the electric field within the curtain gas chamber as otherwise discussed herein.

The following examples are provided for further elucidation of various aspects of the present teachings. The examples are only for illustrative purposes and are not intended to indicate necessarily the optimal ways of practicing the present teachings or the optimal results that may be obtained.

Example 1

Figure 4:
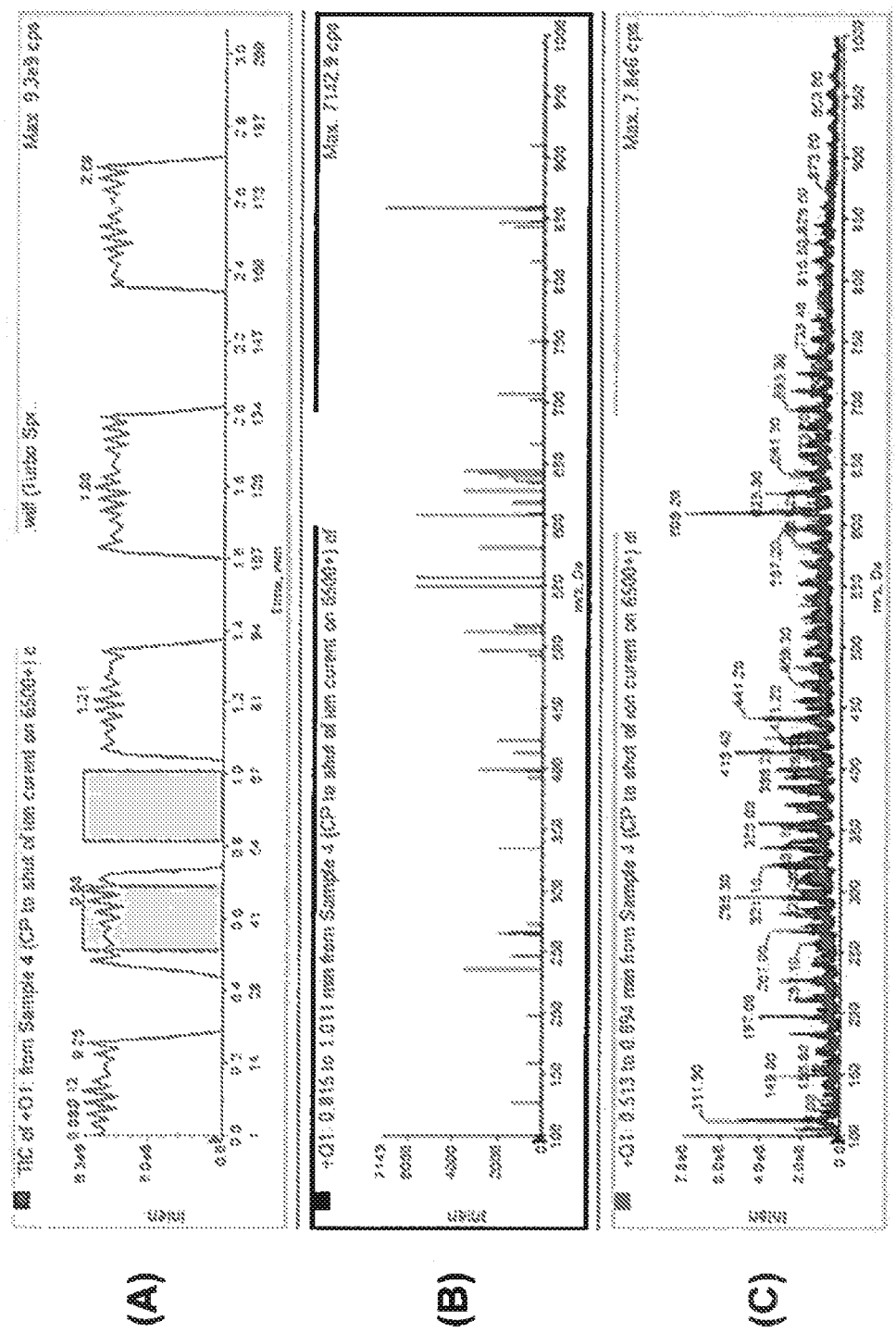
FIGS. 4A-C depict exemplary data comparing the use of the system of FIG. 1 in an exemplary infusion study, in accordance with some aspects of various embodiments of the applicant's teachings.

With reference now to FIGS. 4A-C, this infusion experiment demonstrates a substantial reduction in the number of ions transmitted into the high vacuum components of a mass spectrometer system operated in accordance with various aspects of the present teachings. A sample of reserpine 10 pg/μL was infused on a QTRAP® 6500 Q-q-Q mass spectrometer modified in accordance with the present teachings in which the orifice plate voltage was set to 100 V DC and the curtain plate was adjusted between a value of 1000 V DC and 100 V DC at various points during the infusion. FIG. 4A depicts the total ion current (TIC) detected at each time point over the course of the infusion, with the curtain plate voltage being adjusted to 100 V DC at approximately the following times: 0.3-0.4 min; 0.8-1.1 min; 1.4-1.6 min; and 2.0-2.3 min. As seen in FIG. 4A, the modulation of the curtain plate voltage to the same potential as the orifice plate was effective to block substantially all of the charged species from entering the sampling orifice. In particular, the TIC dropped by a factor of nearly 100,000 when the curtain plate potential was maintained at 0V during the periods of non-transmission. FIG. 4B shows the average mass spectrum obtained during the period of non-transmission from 0.815 min to 1.011 min (right gray box of FIG. 4A), while FIG. 4C depicts the average mass spectrum obtained during the range of 0.513 min to 0.694 min (left gray box of FIG. 4A). It will be observed that substantially fewer species of ions are present in FIG. 4B (CUR=100V) relative to FIG. 4C (CUR=1000V) and further that the max ion current observed in FIG. 4B is 3 orders of magnitude lower than that of FIG. 4C.

It should also be understood that the teachings of invention are not limited to the exemplary mass spectrometer discussed above, and can be implemented in a variety of different mass spectrometers to reduce, and preferably eliminate, the contamination of the mass analyzers during time intervals when data is not acquired.

Those skilled in the art will know or be able to ascertain using no more than routine experimentation, many equivalents to the embodiments and practices described herein. By way of example, the dimensions of the various components and explicit values for particular electrical signals (e.g., amplitude, frequencies, etc.) applied to the various components are merely exemplary and are not intended to limit the scope of the present teachings. Accordingly, it will be understood that the invention is not to be limited to the embodiments disclosed herein, but is to be understood from the following claims, which are to be interpreted as broadly as allowed under the law.

The section headings used herein are for organizational purposes only and are not to be construed as limiting. While the applicant's teachings are described in conjunction with various embodiments, it is not intended that the applicant's teachings be limited to such embodiments. To the contrary, the applicant's teachings encompass various alternatives, modifications, and equivalents, as will be appreciated by those of skill in the art. Those having ordinary skill in the art will appreciate that various changes can be made to the above embodiments without departing from the scope of the invention.

What is claimed is:

1. A mass spectrometer system, comprising:
   an ion source housing defining an ionization chamber, the ionization chamber comprising a curtain plate defining a curtain plate aperture through which ions generated in the ionization chamber from a sample can be transmitted to one or more downstream mass analyzers;
   an orifice plate defining a sampling orifice, said orifice plate being separated from the curtain plate so as to define a curtain chamber therebetween through which ions from the curtain plate aperture can be transmitted to the sampling orifice;
   a power supply electrically coupled to the curtain plate and the orifice plate for providing electrical signals thereto;
   a controller operatively coupled to the power supply, said controller configured to control the electrical signals applied to the curtain plate and orifice plate so as to modulate the electric field within the curtain chamber from a first configuration during a first period in which ions are preferentially transmitted through the sampling orifice and a second configuration during a second period in which ions are substantially prevented from being transmitted through the curtain chamber to the sampling orifice;
   wherein in the first configuration, the electric field in the curtain chamber is configured to draw ions of a first polarity through the curtain chamber and into the sampling orifice and
   wherein in the second configuration, the orifice plate is maintained at least one of at substantially the same DC potential as the curtain plate and at a repulsive potential relative to the potential of the curtain plate for ions generated by the ion source.

2. The system of claim 1, further comprising a curtain gas supply for flowing curtain gas into the curtain chamber, wherein curtain gas flow is effective to prevent at least a portion of molecules within the sample from transiting to the sampling orifice.

3. The system of claim 2, wherein the curtain gas supply is operatively coupled to the controller, said controller being configured to increase the volumetric flow rate of curtain gas provided to the curtain chamber during the second period.

4. The system of claim 1, further comprising an ion source for receiving a fluid sample and for continuously discharging said fluid sample into said ionization chamber, said power supply being electrically coupled to the ion source so as to provide an ion source voltage to the ion source for generating ions as the fluid sample is discharged into the ionization chamber, wherein a flow rate of the fluid sample discharged from the ion source during the first and second period is substantially equal and wherein the ion source voltage is substantially constant during the first and second periods.

5. The system of claim 1, wherein in the first configuration, the curtain plate is maintained at a voltage greater than about +500 V DC and the orifice plate is maintained at a voltage less than about +300 V.

6. The system of claim 1, wherein in the first configuration, the orifice plate is maintained at an attractive potential in a range of about 400 V DC to about 900 V DC relative to the potential of the curtain plate for ions generated by the ion source.

7. The system of claim 1, wherein the fluid sample comprises effluent from a liquid chromatography column, and wherein the first period corresponds to a first portion of the elution gradient in which an analyte of interest is likely to be present and wherein the second period corresponds to a second portion of the elution gradient in which a relative abundance of an analyte of interest therein is likely to be reduced relative to the relative abundance of the analyte of interest in the first portion of the elution gradient.

8. The system of claim 1, wherein the first period comprises a plurality of first periods with second periods therebetween, wherein each of the first periods corresponds to the timing of a sample injection into a liquid carrier stream.

9. The system of claim 1, further comprising a user interface for accepting input from a user defining a data collection window corresponding to the first period in which an analyte of interest is suspected of being present in said fluid sample during a sample run.

10. A method for controlling contamination in a mass spectrometer system, comprising:
    generating one or more ionized species from a sample within an ionization chamber, said ionization chamber comprising a curtain plate defining a curtain plate aperture through which ions generated in the ionization chamber can be transmitted;
    during a first period of ion generation, providing an electric field within a curtain chamber between the curtain plate and an orifice plate disposed downstream from the curtain plate;
    transmitting said one or more ionized species through the curtain chamber and sampling orifice during said first period;
    during a second period of ion generation, adjusting the electric field within the curtain chamber region such that ions are substantially prevented from being transmitted into the sampling orifice; and
    wherein said one or more ionized species are generated by discharging a fluid sample from an ion source into the ionization chamber, wherein flow rates of the fluid sample discharged from the ion source during the first and second periods are substantially equal, and wherein an ion source voltage applied to the ion source is substantially constant during the first and second periods.

11. The method of claim 10, further comprising supplying a curtain gas into the curtain chamber so as to prevent at least a portion of molecules within the sample from transiting to the sampling orifice.

12. The method of claim 11, further comprising increasing the volumetric flow rate of curtain gas provided to the curtain chamber region during the second period relative to the first period.

13. The method of claim 10, wherein during the first period, the electric field in the curtain chamber region is configured to draw ions of a first polarity through the curtain plate aperture and into the sampling orifice.

14. The method of claim 13, wherein during the second period, the orifice plate is maintained at substantially the same DC potential as the curtain plate.

15. The method of claim 13, wherein during the second period, the orifice plate is maintained at a repulsive potential relative to the potential of the curtain plate for ions generated by the ion source.

16. A method for controlling contamination in a mass spectrometer system, comprising:
- generating one or more ionized species from a sample within an ionization chamber, said ionization chamber comprising a curtain plate defining a curtain plate aperture through which ions generated in the ionization chamber can be transmitted;
- during a first period of ion generation, providing an electric field within a curtain chamber between the curtain plate and an orifice plate disposed downstream from the curtain plate;
- transmitting said one or more ionized species through the curtain chamber and sampling orifice during said first period;
- during a second period of ion generation, adjusting the electric field within the curtain chamber region such that ions are substantially prevented from being transmitted into the sampling orifice; and
- further comprising receiving the fluid sample from a liquid chromatography column, wherein the first period corresponds to a first portion of the elution gradient in which an analyte of interest is likely to be present and the second period corresponds to a second portion of the elution gradient in which a relative abundance of an analyte of interest therein is likely to be reduced relative to the relative abundance of the analyte of interest in the first portion of the elution gradient.

\* \* \* \* \*